United States Patent
Misulia et al.

(10) Patent No.: US 11,395,064 B1
(45) Date of Patent: Jul. 19, 2022

(54) VIBRATION DAMPING ACOUSTIC ARRAY

(71) Applicant: Raytheon Company, Waltham, MA (US)

(72) Inventors: Joseph M. Misulia, Attleboro, MA (US); Erik F. Item, Osterville, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/146,795

(22) Filed: Jan. 12, 2021

(51) Int. Cl.
| | |
|---|---|
| *H04R 3/00* | (2006.01) |
| *F16F 15/00* | (2006.01) |
| *H04R 1/02* | (2006.01) |
| *G10K 11/00* | (2006.01) |
| *F16F 15/08* | (2006.01) |
| *H04R 1/00* | (2006.01) |
| *G01S 7/52* | (2006.01) |
| *G10K 11/16* | (2006.01) |
| *G01S 7/521* | (2006.01) |

(52) U.S. Cl.
CPC ............ *H04R 3/002* (2013.01); *F16F 15/08* (2013.01); *G01S 7/52* (2013.01); *G10K 11/00* (2013.01); *G10K 11/008* (2013.01); *G10K 11/16* (2013.01); *H04R 1/00* (2013.01); *H04R 1/02* (2013.01); *H04R 3/005* (2013.01); *G01S 7/521* (2013.01)

(58) Field of Classification Search
CPC ... H04R 1/00; H04R 1/02; H04R 1/08; H04R 1/028; H04R 2201/00; H04R 2201/02; H04R 3/00; H04R 3/002; H04R 3/005; F16F 15/00; F16F 15/02; F16F 15/04; F16F 15/08; G01S 15/00; G01S 15/66; G10K 11/00; G10K 11/002; G10K 11/006; G10K 11/008; G10K 11/16
See application file for complete search history.

(56) References Cited

U.S. PATENT DOCUMENTS

| | | | |
|---|---|---|---|
| 5,062,085 | A | 10/1991 | Andrews, Jr. |
| 5,339,291 | A | 8/1994 | Libuha et al. |
| 5,367,499 | A | 11/1994 | Morningstar et al. |

(Continued)

FOREIGN PATENT DOCUMENTS

| | | | | |
|---|---|---|---|---|
| CN | 104284272 | A | 1/2015 | |
| CN | 108333574 | A * | 7/2018 | ............... G01S 7/52 |

(Continued)

OTHER PUBLICATIONS

PCT International Search Report and Written Opinion dated Mar. 31, 2022 for International Application No. PCT/US2021/061573; 14 Pages.

*Primary Examiner* — Thang V Tran
(74) *Attorney, Agent, or Firm* — Daly Crowley Mofford & Durkee, LLP

(57) ABSTRACT

Methods and apparatus for reducing vibration for an acoustic array. In an embodiment, an acoustic array includes a base structure having apertures and sensors supported by the base structure for providing an acoustic array. Vibration damping material is located in the apertures of the base structure and attachment mechanisms for secure the portions of vibration damping material to a vehicle. A mold material encapsulates the base structure, the sensors and the portions of vibration damping material. The structure and materials are selected to dampen vibration for certain frequencies.

17 Claims, 7 Drawing Sheets

(56) References Cited

U.S. PATENT DOCUMENTS

| | | |
|---|---|---|
| 8,300,497 B1 | 10/2012 | Keith et al. |
| 8,400,878 B2 | 3/2013 | Lindner et al. |
| 2003/0061882 A1 | 4/2003 | Benjamin |

FOREIGN PATENT DOCUMENTS

| | | | |
|---|---|---|---|
| DE | 103 23 493 B3 | 7/2004 | |
| DE | 10 2018 222 038 A1 | 6/2020 | |
| EP | 2 200 017 A2 | 6/2010 | |
| EP | 2 351 018 A2 | 8/2011 | |
| JP | 09230032 A * | 9/1997 | ............... G01S 7/52 |

* cited by examiner

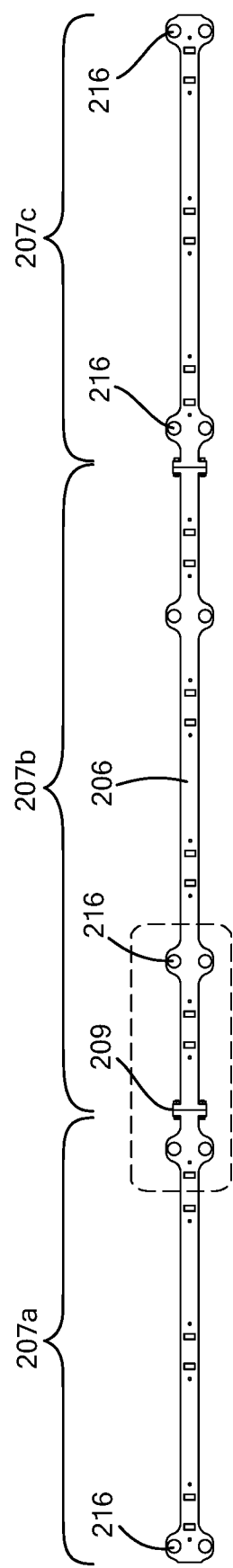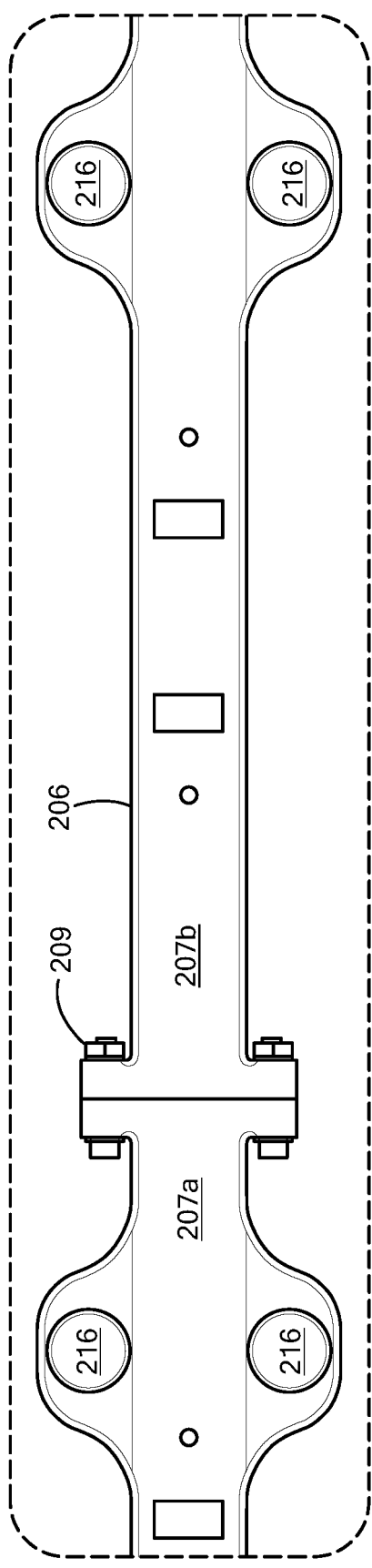

VIBRATION DAMPING ACOUSTIC ARRAY

BACKGROUND

As is known in the art, underwater acoustic arrays can be towed by a surface vessel or underwater vehicle. The sensitivity of acoustic arrays can be degraded by noise, vibration, etc. Conventional sonar systems may include complicated and costly space-consuming isolation systems to reduce vibration interference. Known low frequency acoustic arrays mounted on UUVs or other underwater vehicles may suffer from vibration interference from the UUV or vehicle to which it is mounted.

SUMMARY

Embodiments of the disclosure provide methods and apparatus for an acoustic array that may be mounted on an unmanned underwater vehicle (UUV) or other vehicles that may travel in water or other mediums, such as air. In embodiments, the array conforms to the exterior shape of a vehicle. The array is configured to reduce vibration as compared to conventional acoustic arrays so as to lower noise and associated interference with the acoustic array. The array may be configured to present a hydrodynamic cross section in the presence of flow so that flow induced vibrations may be reduced.

In embodiments, an acoustic array includes an overmold compound that is configured for vibration damping. The array geometry can be adapted for UUVs or underwater vehicles of different shapes, diameters, speed, depth, etc. The vibration damping functionality of the array can be adjusted to isolate different frequencies related to specific applications.

In embodiments, an acoustic array includes a base structure which can comprise a substantially rigid material, such as so-called strongback (engineering plastic in accordance with ULTEM 2300, PEEK or similar) to which sensors can be mounted so that the base structure and sensors are encapsulated in an overmold material, such as urethane or a similar adhesive. In example embodiments, vehicle attachment points/pucks can be secured to the mold material, and coupled to the base structure/sensors only through the mold material. Decoupling the sensors and associated base structure from the mounting points provides vibration damping. The volume of mold material in between the mounting points/pucks and puck geometry can be adjusted to provide different magnitudes of damping or target specific frequencies. The mold material serves to encapsulate sensors and associated electronics, isolate them from environmental affects, and simultaneously act as a vibration reducing coupler to the attachment pucks.

Embodiments of the disclosure provide a vibration damped sonar array that can be mounted directly to vehicle and operate at lower frequencies typically only utilized in towed arrays. The array may be configured to be neutrally buoyant and thereby, well suited to UUV applications or other low power or lightweight applications.

In one aspect, an apparatus comprises: a base structure having apertures; sensors supported by the base structure for providing an acoustic array; portions of vibration damping material in the apertures of the base structure, wherein the vibration damping material does not contact the base structure; attachment mechanisms for securing the portions of vibration damping material to a vehicle, wherein the attachment mechanisms pass through the apertures in the base structure; and a mold material encapsulating the base structure, the sensors and the portions of vibration damping material, wherein the mold material includes holes aligned with the apertures in the base structure, wherein the mold material and the portions of damping material secure the acoustic array to the vehicle.

An apparatus can include one or more of the following features: the attachment mechanisms comprise bolts, the portions of vibration damping material include a protrusion that is greater than a distance across the apertures in the mold material, the protrusions comprise a ridge, blocks supported by the base structure to hold wires connecting adjacent ones of the sensors, a length across the portions of vibration damping material is greater than a length across the holes in the mold material, the length across the portions of vibration damping material comprises a diameter, the sensors are arranged linearly, the acoustic array is conformal, the base structure is coupled to the portions of vibration damping material only through the mold material, a volume of the mold material between the portions of vibration damping material may be selected for damping a signals in a given frequency range, the base structure comprises a rigid plastic material, and/or the mold material comprises urethane.

In another aspect, a method comprises: employing a base structure having apertures; attaching sensors to the base structure for providing an acoustic array; forming portions of vibration damping material in the apertures of the base structure, wherein the vibration damping material does not contact the base structure; employing attachment mechanisms for securing the portions of vibration damping material to a vehicle, wherein the attachment mechanisms pass through the apertures in the base structure; and encapsulating the base structure, the sensors and the portions of vibration damping material with a mold material, wherein the mold material includes holes aligned with the apertures in the base structure, wherein the mold material and the portions of damping material secure the acoustic array to the vehicle.

A method can further include one or more of the following features: the attachment mechanisms comprise bolts, the portions of vibration damping material include a protrusion that is greater than a distance across the apertures in the mold material, the protrusions comprise a ridge, blocks supported by the base structure to hold wires connecting adjacent ones of the sensors, a length across the portions of vibration damping material is greater than a length across the holes in the mold material, the length across the portions of vibration damping material comprises a diameter, the sensors are arranged linearly, the acoustic array is conformal, the base structure is coupled to the portions of vibration damping material only through the mold material, a volume of the mold material between the portions of vibration damping material may be selected for damping a signals in a given frequency range, the base structure comprises a rigid plastic material, and/or the mold material comprises urethane.

BRIEF DESCRIPTION OF THE DRAWINGS

The foregoing features of this disclosure, as well as the disclosure itself, may be more fully understood from the following description of the drawings in which:

FIG. 4A is a side view of a base structure of an acoustic array in accordance with example embodiments of the disclosure; and FIG. 4B is a top view of the base structure of FIG. 4A in accordance with example embodiments of the disclosure.

DETAILED DESCRIPTION

Figure 1:
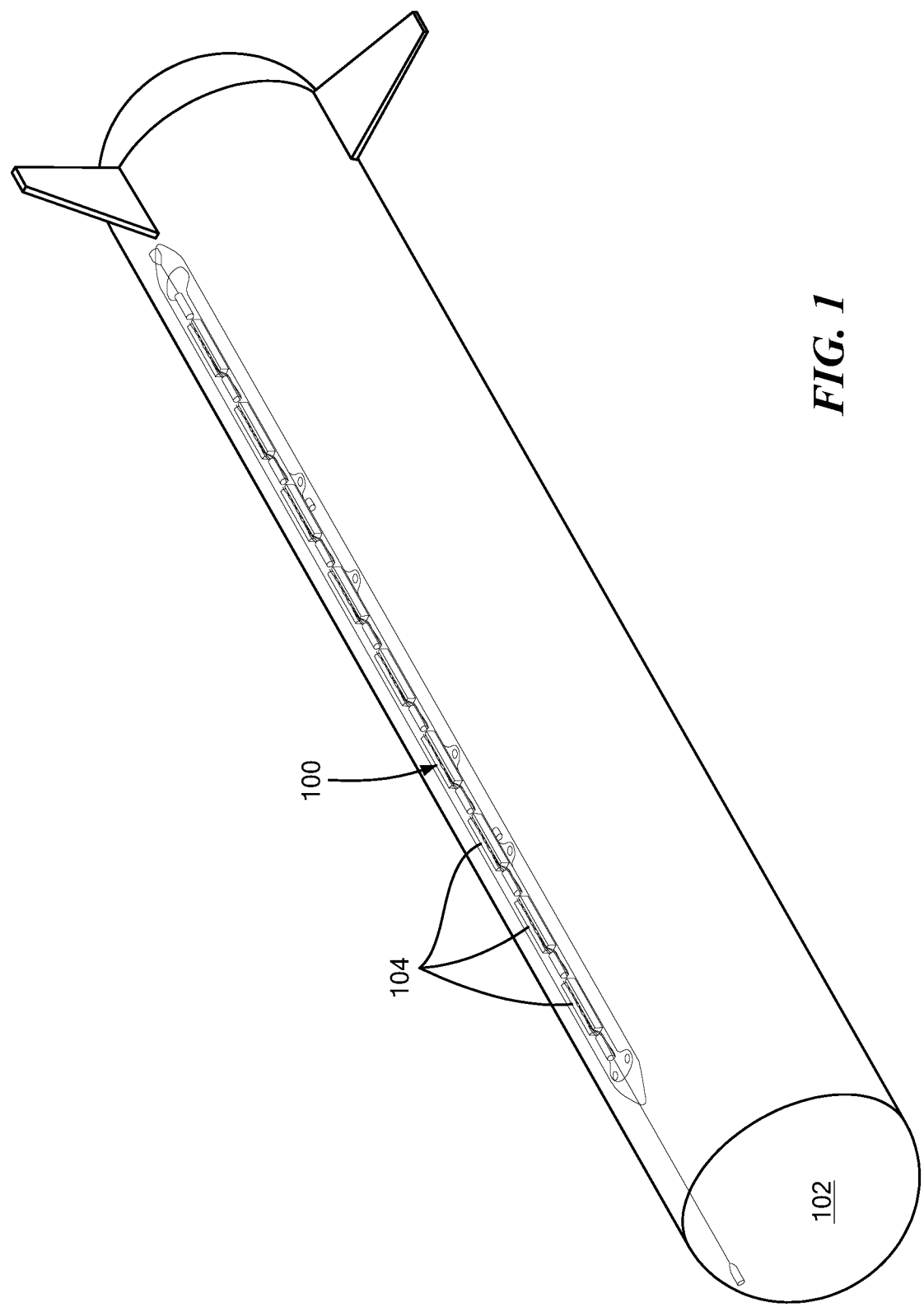
FIG. 1 is an isometric view of an acoustic array in accordance with example embodiments of the disclosure secured to the surface of an underwater vehicle.

FIG. 1 shows an example acoustic array 100 secured to the external surface of an illustrative unmanned underwater vehicle (UUV) 102. In embodiments, the array 100 includes a series of sensors 104 that detect signals within a given frequency band. The UUV 102 may be configured to be stationary or mobile. In embodiments, the UUV 102 may travel underwater and provide a mobile passive detection system. Multiple UUVs 102 may travel in a coordinated pattern to provide a desired coverage area.

While the sensors 104 are shown in a linear arrangement, it is understood that sensors can be located in any suitable pattern to meet the needs of a particular application.

Figure 2A:
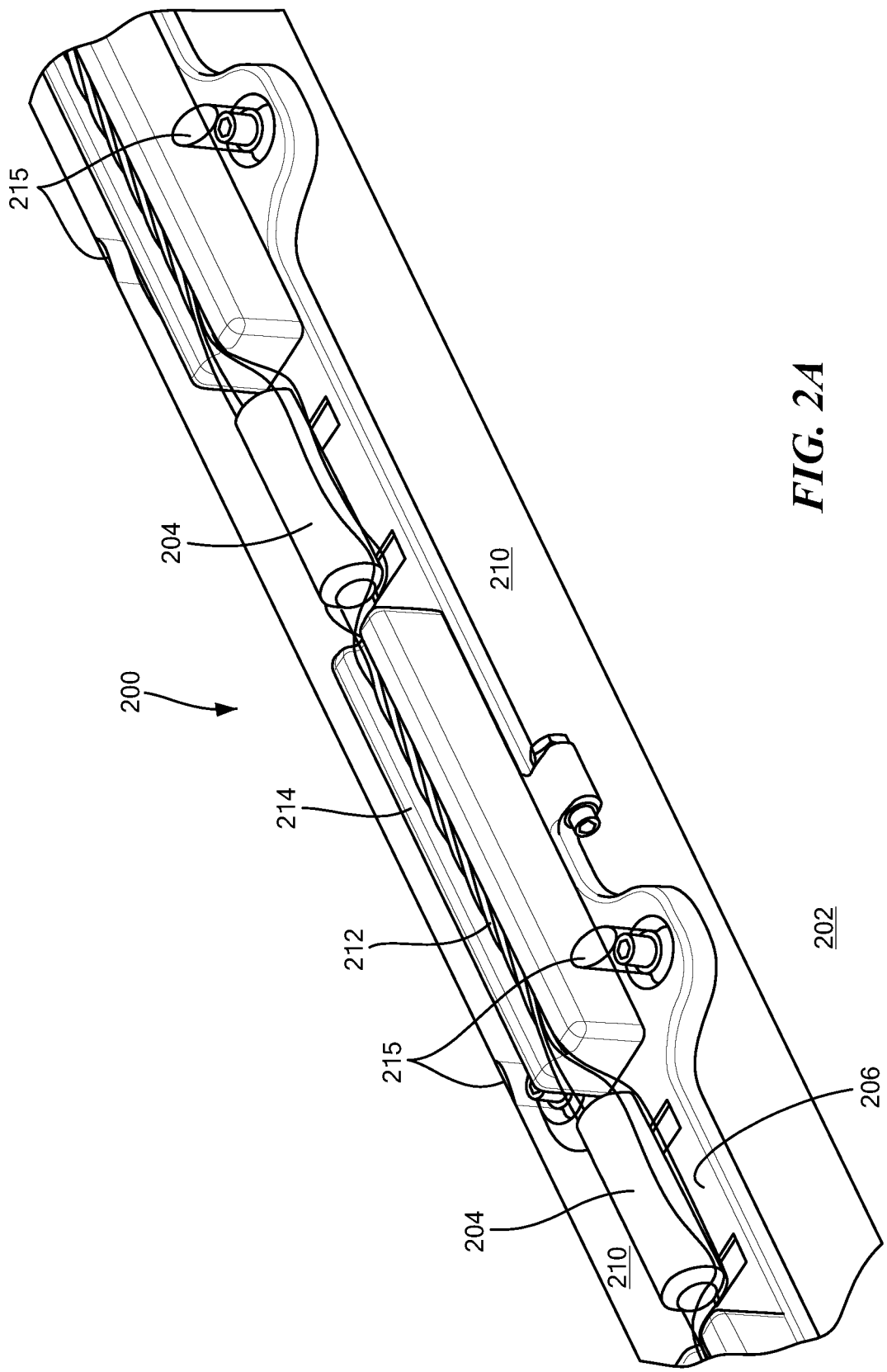
FIG. 2A is a partially transparent isometric view of a portion of an acoustic array in accordance with example embodiments of the disclosure.
Figure 2B:
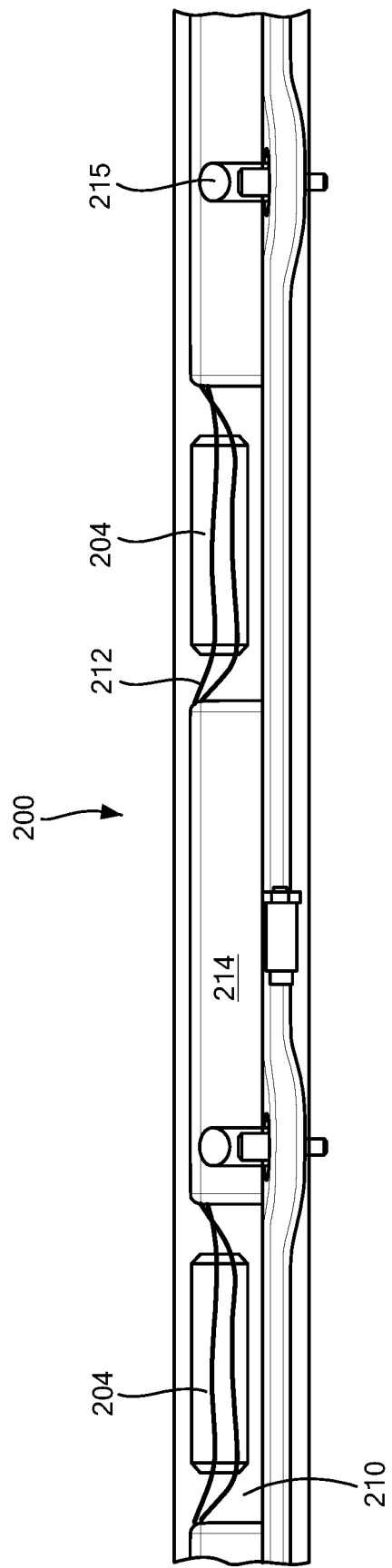
FIG. 2B is a cross-sectional view of a portion of an acoustic array in accordance with example embodiments of the disclosure.
Figure 2C:
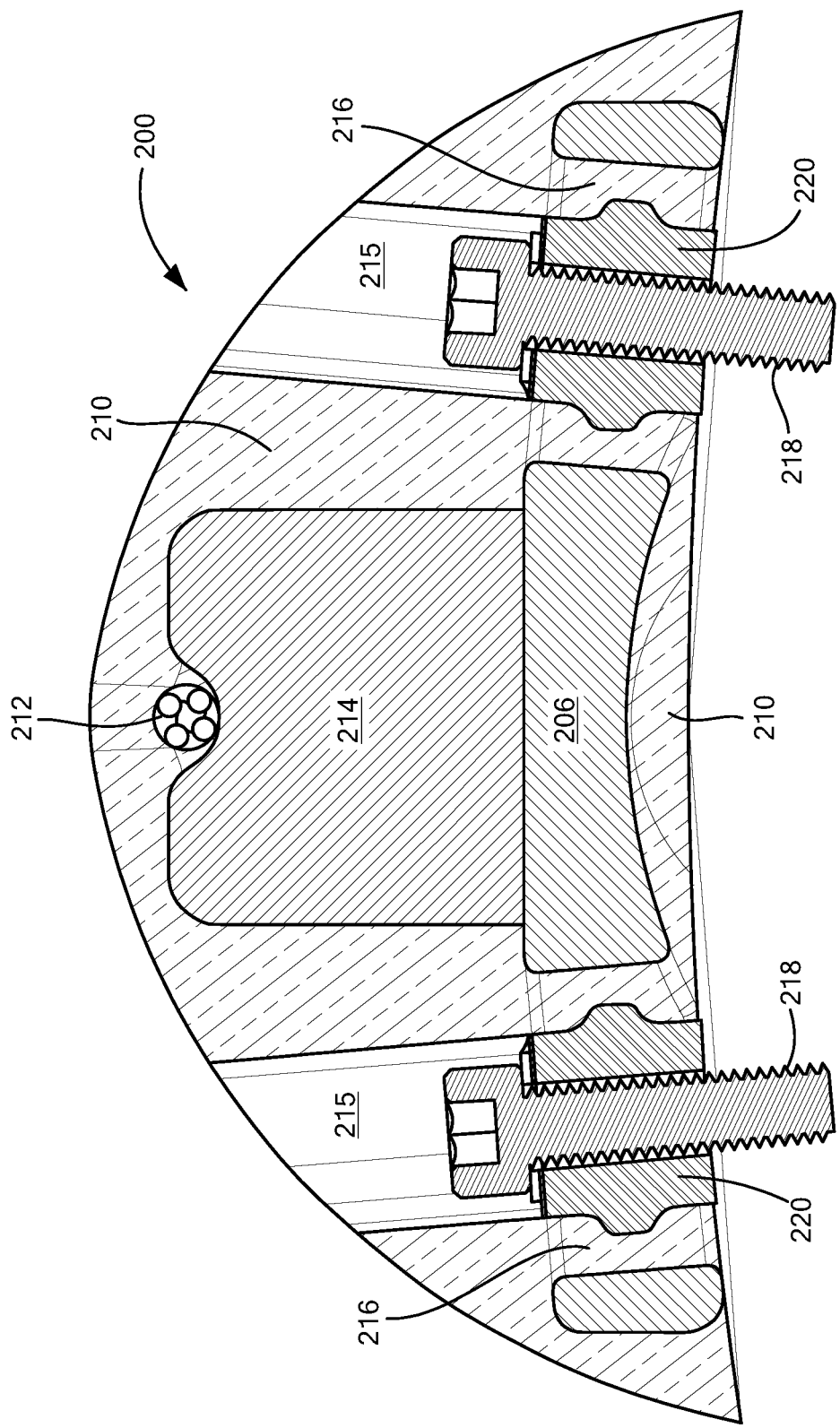
FIG. 2C is a cross-sectional view of a portion of an acoustic array in accordance with example embodiments of the disclosure.

FIGS. 2A, 2B, and 2C show further detail of an example acoustic array 200 configured for vibration damping while secured to a vehicle 202 in accordance with illustrative embodiments of the disclosure. A series of sensors 204 are supported by a rigid base structure 206. In embodiments, the base structure 206 has apertures formed to facilitate securing the array to the vehicle 202, as described more fully below. The base structure 206 may be a continuous layer or may comprise portions that can be secured together.

The sensors 204 may be suspended in the overmold compound. Suitable hydrophone sensors 204 for acoustic arrays are well known in the art. Adjacent sensors 204 can be coupled via wires 212 that may be supported by syntactic blocks 214, which may be formed from a foam material that provide buoyancy for the subject array.

As best seen in FIG. 2C, holes or cavities 215 can be formed in the encapsulant mold material 210 into which bolts 218, for example, can be inserted for attaching the array to the vehicle. A damping material 220 can disposed between a head of the bolts 218 and the surface of the vehicle. In embodiments, the attachment points of the array are attached by the encapsulant 210 and coupled to the base structure 206 and sensors 204 only through the mold material encapsulant 210.

While bolts are shown in illustrative embodiments, it is understood that any suitable attachment mechanism to secure the array to the vehicle can be used.

Figure 3:
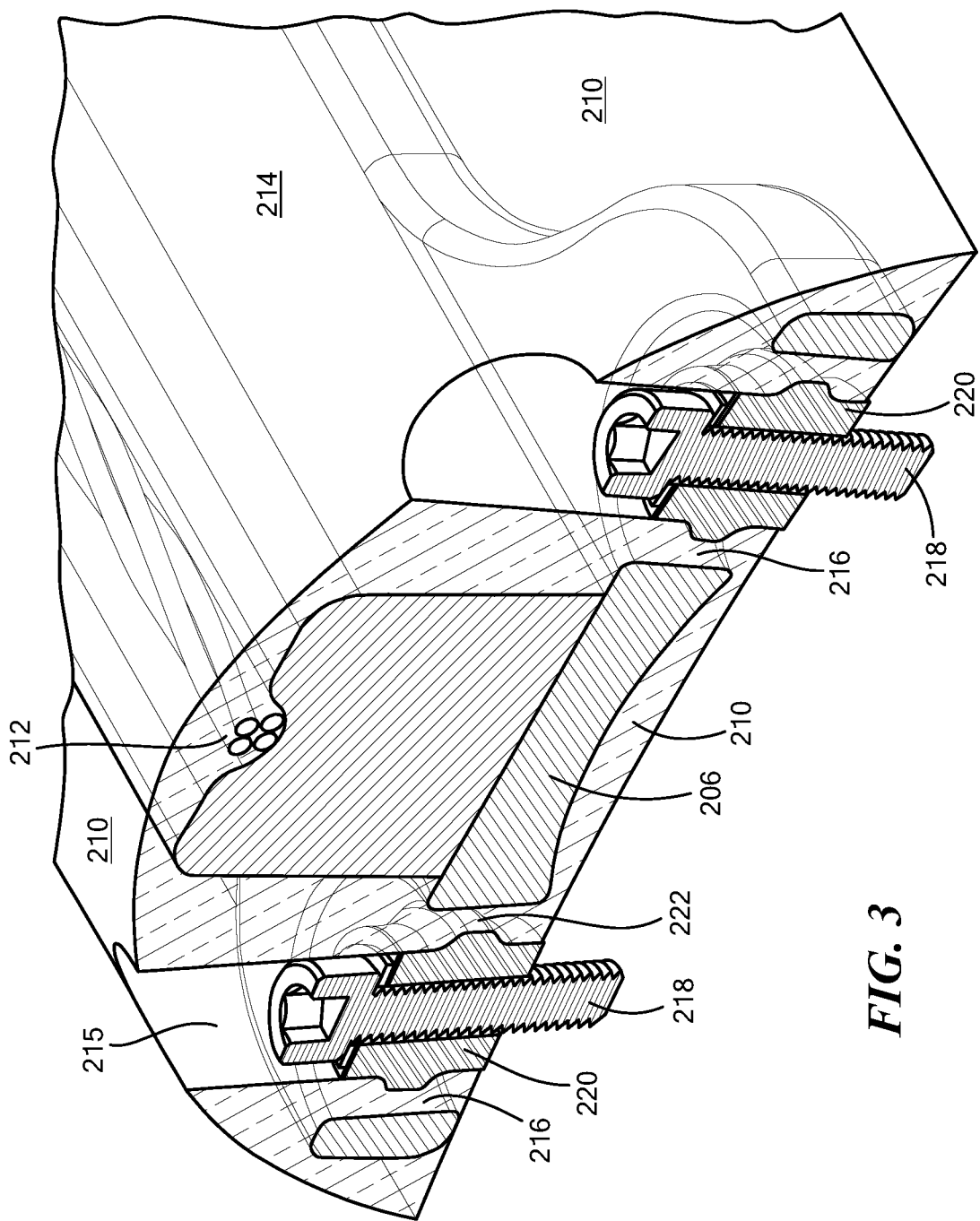
FIG. 3 partially transparent isometric view of a cross-section of an acoustic array in accordance with example embodiments of the disclosure.

FIG. 3 shows additional detail of an example attachment configuration to secure the array 200 to the surface of a vehicle. In an example embodiment, the base structure 206 includes apertures 216 that enable attachment of the array to the surface of a vehicle. The overall configuration of the array and attachment mechanism dampens vibration to enhance performance of the sensors 204 by decreasing noise in the signal received by the sensors. For example, the attachment mechanism decreases noise transferred from the vehicle to the acoustic array 200.

In embodiments, the damping material 220 acts as a washer between the head of the bolts 218 and the surface of the vehicle. In the illustrated embodiment, the damping material 220 includes a ridge 222 about its circumference. The ridge 222 has a diameter that is greater than a diameter of the holes 215 in the encapsulant 210. As can be seen, the encapsulant 210 effectively secures the acoustic array 200 to the vehicle. The attachment mechanism formed by the bolts 218 and damping material 220, which can be referred to a mounting puck, does not touch the base structure 206 that supports the sensors 204.

While a ridge 222 is shown in an example embodiment, it is understood that a wide variety of structures having any suitable geometry can function to enable the encapsulant 210 to secure the sensors 204 and the base structure 206 to the vehicle. In general, some encapsulant material 210 should be underneath at least a portion of damping material 220.

Figure 3A:
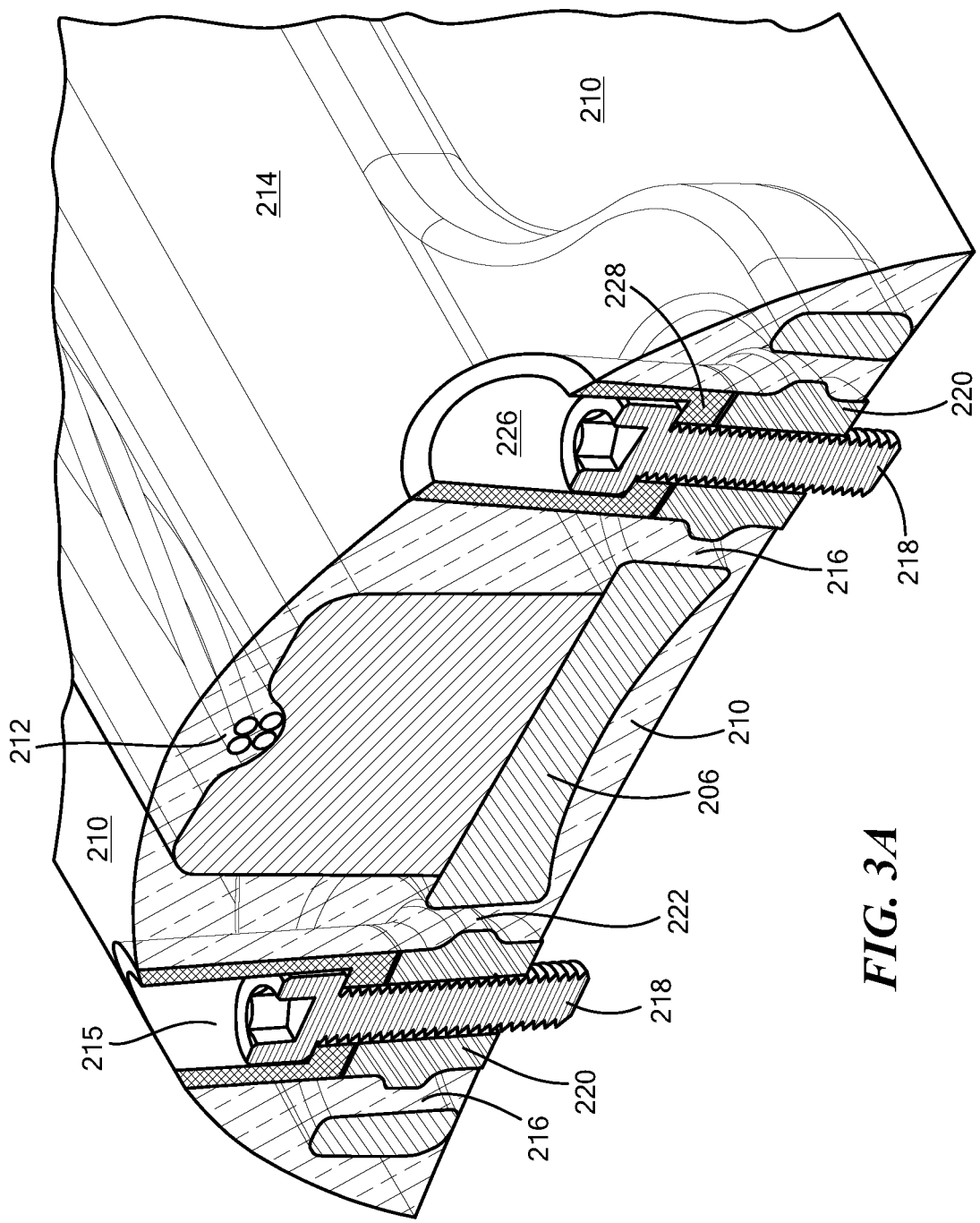
FIG. 3A partially transparent isometric view of a cross-section of an acoustic array in accordance with further example embodiments of the disclosure.

FIG. 3A shows a method for creating bolt clearance in the encapsulate material. In embodiments, a sleeve 226 can be embedded in the encapsulant material 210. The sleeve 226 defines the cavity 215 in the encapsulant. Optionally, the sleeve 226 can include an underhang portion 228 abutting a top of the damping material 220 underneath a head of the bolt 218.

It is understood that the materials and geometry of the various components can be selected to achieve desired frequency characteristics. For example, the size of the hole 215 in the encapsulant 210 can vary based on a desired frequency response. Also, the volume of encapsulant 210 between the mounting pucks, the puck geometry, and the like can be selected to provide different magnitudes of damping and/or target specific frequencies.

FIG. 4A is a top view and FIG. 4B is a more detailed top view of an example base structure 206 having sections 207a,b,c coupled together via bolts 209. The apertures 216 are sized to enable a bolt 218 (FIG. 3C) to pass through and provide space for a desired volume of encapsulant 210. The width, thickness and length, for example, of the base structure 206 can vary to meet the needs of a particular application. In embodiments, the base structure 206 is substantially rigid for robust support of the sensors 204 and blocks 214.

In embodiments, the overmold encapsulant material 210 comprises urethane or similar adhesive having vibration damping properties. One suitable material for the base structure 206 comprises such as so-called strongback which is an engineering plastic in accordance with ULTEM 2300. Different substrates may be used depending on the buoyancy and stiffness requirements of the specific application.

Embodiments of the disclosure provide an acoustic array for mounting on a UUV or other vehicle having a variety of sizes. In other embodiments, an acoustic array can be towed by a vehicle. In embodiments, the array is conformal and vibration damping for reducing vehicle noise and associated interference with the acoustic array. The vibration damping characteristics can be varied to isolate different frequencies related to specific mounting applications.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. An apparatus, comprising:
   a base structure having apertures;
   sensors supported by the base structure for providing an acoustic array;
   portions of vibration damping material in the apertures of the base structure, wherein the vibration damping material does not contact the base structure;
   attachment mechanisms for securing the portions of vibration damping material to a vehicle, wherein the attachment mechanisms pass through the apertures in the base structure; and
   a mold material encapsulating the base structure, the sensors and the portions of vibration damping material, wherein the mold material includes holes aligned with the apertures in the base structure, wherein the mold material and the portions of damping material secure the acoustic array to the vehicle and provide vibration damping.

2. The apparatus according to claim 1, wherein the attachment mechanisms comprise bolts.

3. The apparatus according to claim 1, wherein the portions of vibration damping material include a protrusion that is greater than a distance across the apertures in the mold material.

4. The apparatus according to claim 3, wherein the protrusions comprise a ridge.

5. The apparatus according to claim 1, wherein a length across the portions of vibration damping material is greater than a length across the holes in the mold material.

6. The apparatus according to claim 5, wherein the length across the portions of vibration damping material comprises a diameter.

7. The apparatus according to claim 1, wherein the acoustic array is conformal.

8. The apparatus according to claim 1, wherein the base structure is coupled to the portions of vibration damping material only through the mold material.

9. The apparatus according to claim 1, wherein a volume of the mold material between the portions of vibration damping material is selected for damping a signals in a given frequency range.

10. The apparatus according to claim 1, wherein the base structure comprises a rigid plastic material.

11. The apparatus according to claim 1, wherein the mold material comprises urethane.

12. A method, comprising:
    employing a base structure having apertures;
    attaching sensors to the base structure for providing an acoustic array;
    forming portions of vibration damping material in the apertures of the base structure, wherein the vibration damping material does not contact the base structure;
    employing attachment mechanisms for securing the portions of vibration damping material to a vehicle, wherein the attachment mechanisms pass through the apertures in the base structure; and
    encapsulating the base structure, the sensors and the portions of vibration damping material with a mold material, wherein the mold material includes holes aligned with the apertures in the base structure, wherein the mold material and the portions of damping material secure the acoustic array to the vehicle and provide vibration damping.

13. The method according to claim 12, wherein the portions of vibration damping material include a protrusion that is greater than a distance across the apertures in the mold material.

14. The method according to claim 13, wherein the protrusions comprise a ridge.

15. The method according to claim 12, wherein the acoustic array is conformal.

16. The method according to claim 12, wherein the base structure is coupled to the portions of vibration damping material only through the mold material.

17. An apparatus, comprising:
    a base structure having apertures;
    sensors supported by the base structure for providing an acoustic array;
    means for damping vibration disposed in the apertures of the base structure, wherein the means for damping vibration does not contact the base structure;
    attachment means for securing the portions of vibration damping material to a vehicle, wherein the attachment means pass through the apertures in the base structure; and
    means for encapsulating the base structure, the sensors and the means for damping vibration, wherein the means for encapsulating includes holes aligned with the apertures in the base structure, wherein the means for encapsulating and the means for damping vibration secure the acoustic array to the vehicle.

* * * * *